(12) United States Patent
Lenk et al.

(10) Patent No.: US 6,366,923 B1
(45) Date of Patent: Apr. 2, 2002

(54) GATHERING SELECTED INFORMATION FROM THE WORLD WIDE WEB

(75) Inventors: Cecilia Lenk, Watertown; James E. Gouldstone, Brighton; James G. Reidy, Westboro; Carl J. Gort, Marlboro, all of MA (US)

(73) Assignee: Webivore Research, LLC, Watertown, MA (US)

( * ) Notice: Subject to any disclaimer, the term of this patent is extended or adjusted under 35 U.S.C. 154(b) by 0 days.

(21) Appl. No.: 09/046,364

(22) Filed: Mar. 23, 1998

(51) Int. Cl.$^7$ ............................................. G06F 17/30
(52) U.S. Cl. .......................................... 707/104; 707/1
(58) Field of Search ................................ 709/219, 218, 709/300; 707/6, 10, 104, 1; 379/93, 15; 345/333, 339, 343; 399/366; 395/326

(56) References Cited

U.S. PATENT DOCUMENTS

| | | | | |
|---|---|---|---|---|
| 5,649,186 A | * | 7/1997 | Ferguson | 707/10 |
| 5,675,752 A | * | 10/1997 | Scott et al. | 345/333 |
| 5,675,753 A | * | 10/1997 | Hansen et al. | 345/333 |
| 5,701,451 A | * | 12/1997 | Rogers et al. | 707/1 |
| 5,754,178 A | * | 5/1998 | Johnston, Jr. et al. | 345/343 |
| 5,764,873 A | * | 6/1998 | Magid et al. | 345/339 |
| 5,864,848 A | * | 1/1999 | Horvitz et al. | 707/6 |
| 5,870,552 A | * | 2/1999 | Dozier et al. | 709/219 |
| 5,884,312 A | * | 3/1999 | Dustan et al. | 707/10 |
| 5,892,908 A | * | 4/1999 | Hughes et al. | 709/250 |
| 5,905,866 A | * | 5/1999 | Nakabayashi et al. | 709/223 |
| 5,911,067 A | * | 6/1999 | Owens et al. | 709/300 |
| 5,918,228 A | * | 6/1999 | Rich et al. | 707/10 |
| 5,920,861 A | * | 7/1999 | Hall et al. | 707/9 |
| 5,923,845 A | * | 7/1999 | Kamiya et al. | 379/93.15 |
| 5,925,126 A | * | 7/1999 | Hsieh | 713/200 |
| 5,944,791 A | * | 8/1999 | Scherpbier | 709/218 |
| 5,986,669 A | * | 11/1999 | Kirkland | 345/434 |
| 6,269,362 B1 | * | 7/2001 | Broder et al. | 707/4 |

FOREIGN PATENT DOCUMENTS

| | | | |
|---|---|---|---|
| WO | 99/49396 | * | 9/1999 |
| WO | 00/50972 | * | 7/2000 |

OTHER PUBLICATIONS

Millman, Howard, "WebSeeker Searches for Searchers; Web Buddy Delivers to Your Desktop," Internet World, Jan. 13, 1997, v. 19, No. 2.*
Grasp Information Corp.: KnowIt All, PC Magazine Online, May 14, 1996 http://www.8.zdnet.com/pcmag/issues/1509/pcmg0101.htm.
Software DataViz: Web Buddy, PC Magazine Online, Jul. 1, 1998 http://www.zdnet.com/pcmag/firstlooks/9806/f980702a7.htm.
Q.Corp Q–Notes, Apr. 25, 1998, www.qcorp.com.

* cited by examiner

Primary Examiner—Thomas Black
Assistant Examiner—Charles L. Rones
(74) Attorney, Agent, or Firm—Fish & Richardson, P.C.

(57) ABSTRACT

A system for conducting research on the Internet accesses a pre-selected web site on a computer network through a host site and provides a view of a page from the web site on a computer monitor in an environment downloaded at least in part from the host within which data can be clipped from the view and saved to a file, along with site-specific reference data, which includes, for example the site name, author, and URL. A human-perceptible document can be produced from the clipped data and the data can be edited.

19 Claims, 10 Drawing Sheets

Microfiche Appendix Included
(3 Microfiche, 166 Pages)

GATHERING SELECTED INFORMATION FROM THE WORLD WIDE WEB

REFERENCE TO MICROFICHE APPENDIX

A microfiche appendix is attached to this application. The appendix, which includes a source code listing of an embodiment relating to the invention, includes 166 pages of source code on 3 microfiche.

A portion of the disclosure of this patent document contains material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

This invention relates to an Internet research tool.

The Internet enables users to access an abundance of information from computer systems throughout the world. Users can find useful information pertinent to their interests by using a browser and a computer-implemented search program known as a search engine. A search engine reads keywords that a user enters into a user interface, locates the keywords in documents published on a computer running a World Wide Web server process or a computer supporting Usenet, and provides access to the documents containing the keywords.

With regards to the World Wide Web, when an interesting World Wide Web site is located, an individual can save data that refers to the location of the site so that he or she may return to the site at a later time. Netscape Navigator™, a product from Netscape Communications Corporation, provides "bookmarks" for this purpose. Bookmarks are stored in a personal file and are essentially addresses to sites.

The amount of information retrieved by a search engine can be overwhelming and of minimal quality to the person who initiated the search. Due to the enormous amount of information retrieved and the desire for selectivity, software is available that locates information on the Internet that may have value to a group of individuals.

SUMMARY OF THE INVENTION

The present invention features a computer-implemented method for conducting research on the Internet. The method accesses a web page on a computer network and provides a view of the web page on a computer monitor. A portion of the web page can be clipped from the view and automatically saved to a file. The method annotates the file and produces a human-perceptible document from the clipped data. The human-perceptible document is output, for example, to a computer monitor.

A GUI element switches the research mode from a search mode to a collect mode, including distinct sets of tools used in the respective modes. In the collect mode, the method enables a user to gather information from a selected part of a web page, including text, images, audio data, and other multi-media data. The gathered information is saved to a clipping file on disk.

Annotation is included in the same clipping file as the collected information. The annotation is system-provided and automatically saved with the clipping. This system-provided annotation may be bibliographic information (e.g., in a cite format) and may include a document name, an author, a URL, and a date. Additional annotations, composed by a user, can be included in the same file.

Sites are pre-selected to control the quality of the content retrieved. The method presents the pre-selected sites beneath a hierarchy of topics. After a pre-selected site name is selected and prior to accessing the corresponding web site, the method automatically displays a preview of the site so that a user can decide whether to visit the site. A hierarchical path of topics used to reach the pre-selected sites is continuously displayed in the user interface during the search mode.

The method provides an efficient means to conduct research on the Internet for professional or educational purposes, by organizing and presenting topics, locating data on a computer network that is relevant to a selected topic, and collecting selected data found on a remote computer to a local computer medium.

An Internet research tool 102 is capable of collecting only a portion of a web page rather than having to copy an entire web page, recognizing that not all information located by the researcher is valuable or necessary to the research. In the context of the Internet, which makes available enormous amounts of information, an Internet research tool that helps a person focus on only important items of information and gather only pertinent information, thus improving the efficiency of that person as a researcher and providing economic benefits as well, for example, reducing the amount of time spent using resources necessary to use the Internet.

BRIEF DESCRIPTION OF THE DRAWINGS

The foregoing features and other aspects of the invention will become more apparent from the drawings taken together with the accompanying description, in which.

DETAILED DESCRIPTION

Figure 1:
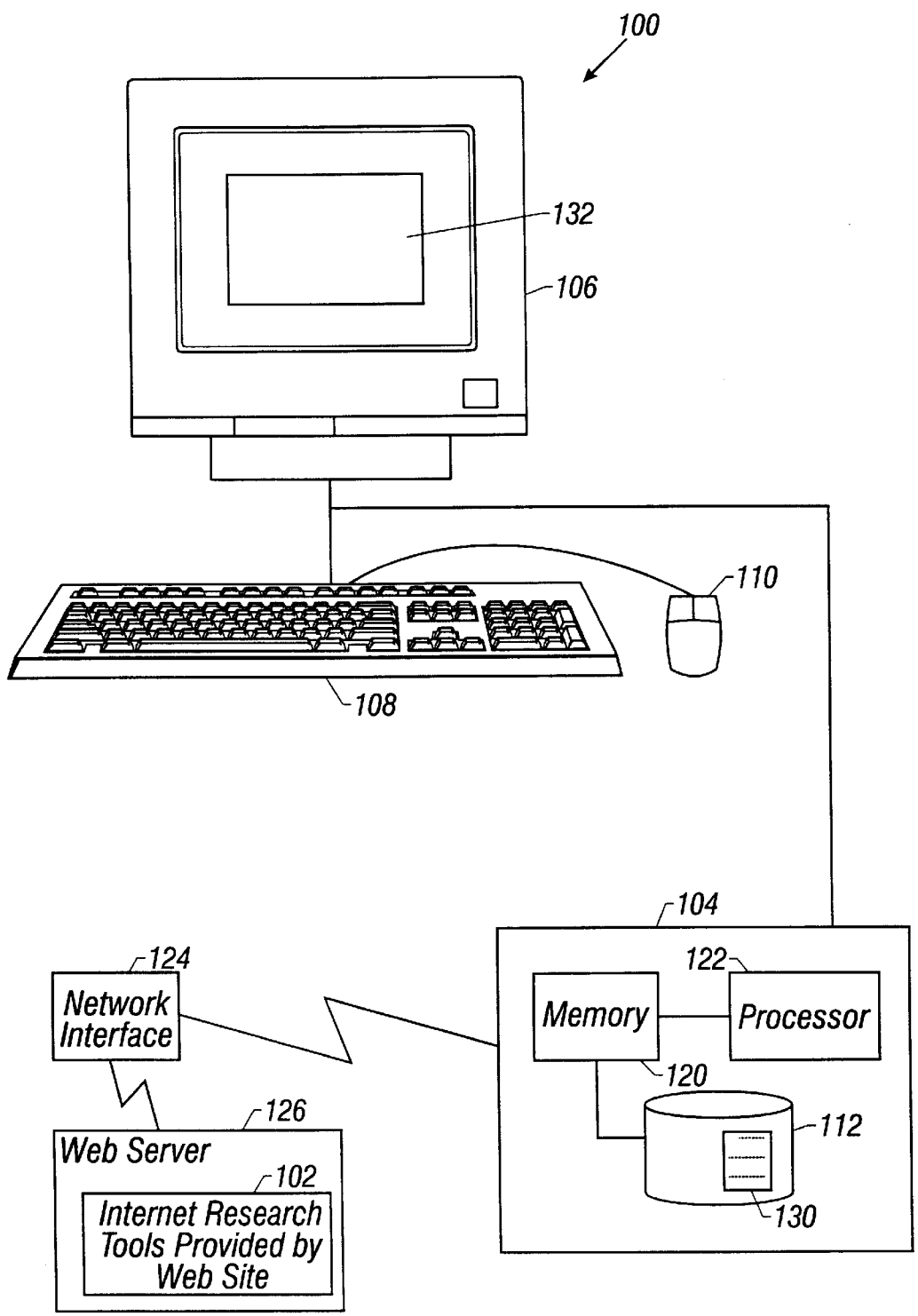
FIG. 1 is a diagram of a computer platform suitable for supporting an Internet research tool in accordance with the invention.

FIG. 1 shows a computer platform 100 suitable for supporting one or more Internet research tools 102. The computer platform 100 includes a digital computer 104, a display monitor 106, a keyboard 108, a mouse or other pointing device 110, and a mass storage device 112 (e.g., hard disk drive, magneto-optical disk drive, or floppy disk drive). The computer 104 includes memory 120, a processor 122, and other customary components, such as, memory bus and peripheral bus (not shown). The computer 104 has a network interface 124 to communicate with remote computer systems, such as a web server 126.

An Internet research tool 102 enables a user to conduct research on the Internet, using World Wide Web pages as the source material for the research. (World Wide Web sites and World Wide Web pages will be referred to simply as web sites and web pages, respectively.) Internet research tool 102 is accessed via a web browser such as Microsoft Corporation's Internet Explorer™ or Netscape Communication Corporation's Navigator™. After starting a browser that displays a browser window on a local computer, a user begins using an Internet research tool 102 by going to the web site that provides the Internet research tools 102, for example, by entering the domain name www.webivore.com beside the "Location:" prompt in the Netscape Navigator™ browser window. Thus, window 132 is a web browser window that initially displays a page from the web site that provides Internet research tools 102. Gaining access to an Internet research tool 102 may require keying in a valid user name and password before the research tool 102 displays a web page on the local platform 100.

The first web page displayed by the Internet research tool presents sets of topics in a hierarchical fashion to the user. The user selects a topic and can access Internet sites containing information on the selected topic via a hypertext link to another web site. After accessing an Internet site, the user can gather information from the selected site by selectively saving useful information.

Figure 2:
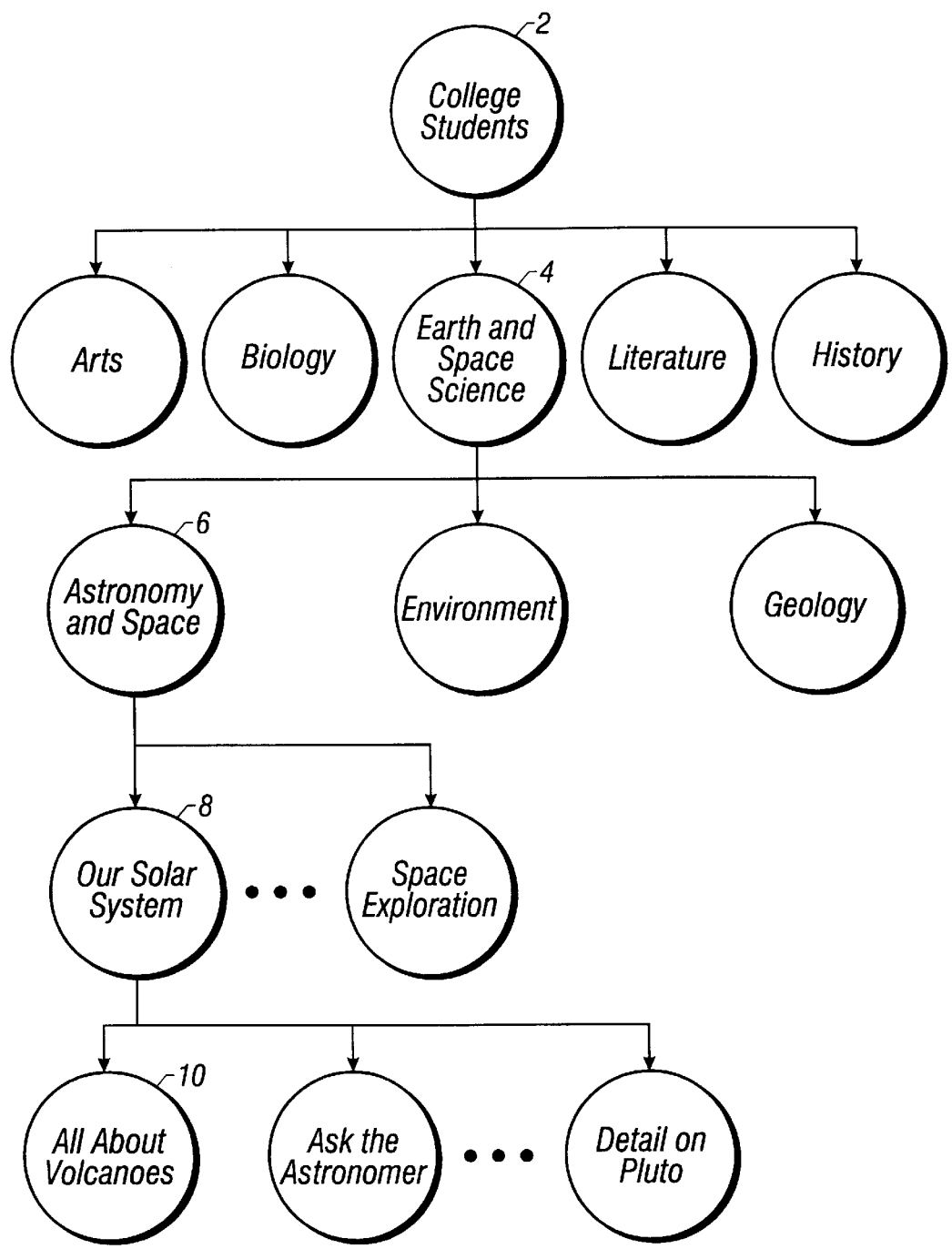
FIG. 2 is a diagram of a hierarchy of topics.

Referring to FIG. 2, each Internet research tool 102 is designed for a particular set of topics. Each set of topics has a hierarchical arrangement. For example, one Internet research tool contains topics for college students 2 such as arts, biology, earth and space science, history, governments, and literature. These topics are further divided into sub-topics. For example, the Earth and Space Science topic 4 has sub-topics that include Astronomy and Space 6, Environment, and Geology. Astronomy and Space 6 is further divided into sub-topics, such as a topic titled Our Solar System 8. Other Internet research tools 102 provide topics for high school students, elementary school students, and people with specific interests such as interests in medical research.

Each Internet research tool 102 provides access via hypertext links to pre-selected web sites. Upon linking to a pre-selected web site, research tool 102 retrieves system-provided information from the web server 126. System-provided information may be site references that include authorship and a uniform resource locator (URL) that references data on the Internet. The system-provided information is stored in a data buffer named collectflash. In the collectflash buffer, the system-provided information is automatically combined with information collected from a web page at the pre-selected web site, such as text, images, audio data, or any mime-type encoded into the system. Additionally, the user can produce information, such as descriptive notes, to store with the collected data. The information from the web page at the pre-selected web site, the system-provided information, and the user-provided information are saved to a storage device, which will be discussed. The file in which the information is saved is in a user-named file folder located on a local storage device.

Figure 3:
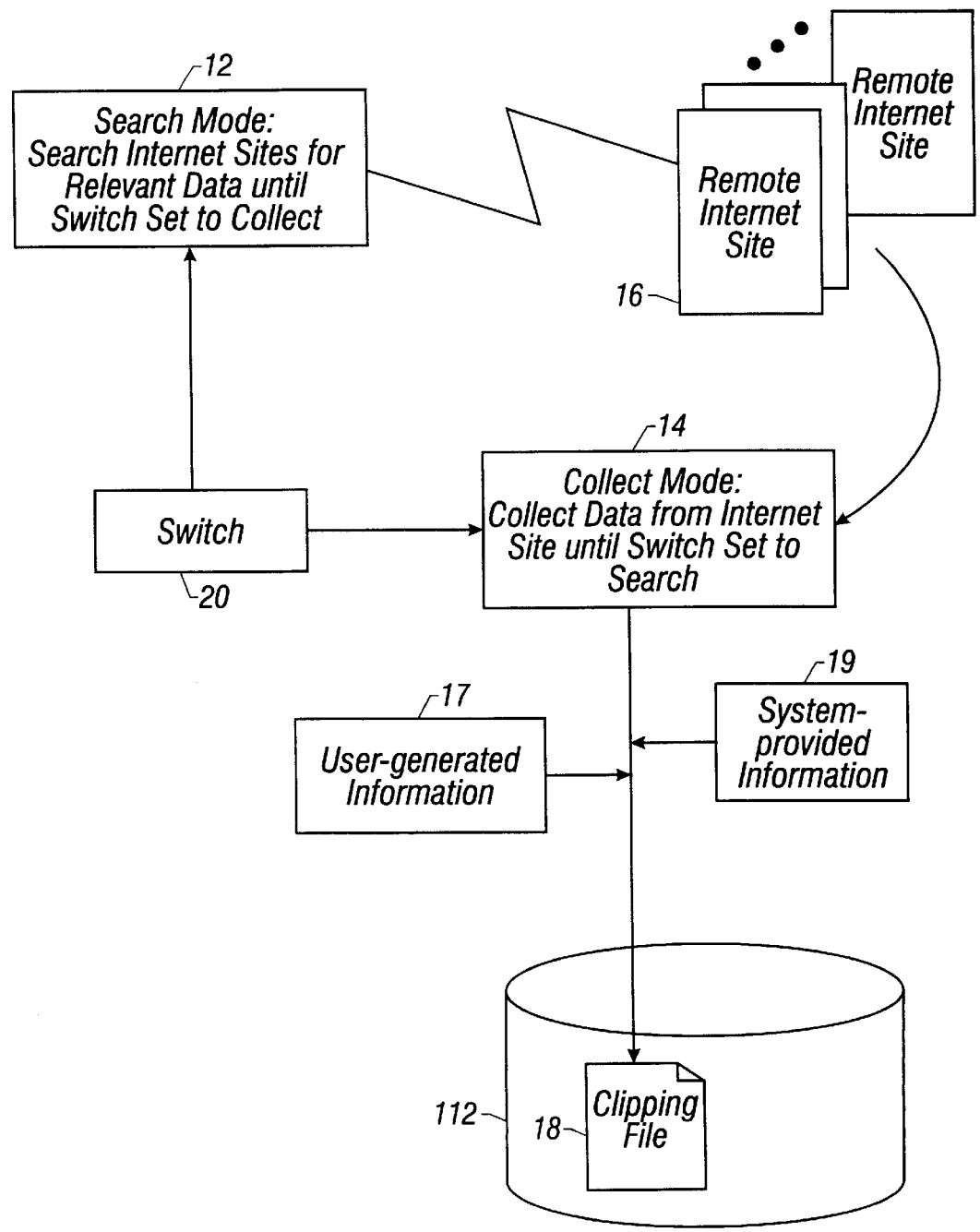
FIG. 3 is a diagram showing a switch between search and collection modes.

Referring now to FIG. 3, an Internet research tool 102 divides the research task into two primary modes, search mode 12 and collect mode 14. Each mode is displayed as a web page. Search mode 12 has distinct components from collect mode 14. Search mode 12 enables a user to search for relevant Internet sites, whereas collect mode 14 enables a user to collect data from an Internet site. The position of a graphical user interface (GUI) element switch 20 determines whether the search mode 12 or the collect mode 14 is active. The user moves GUI element switch 20 from the search position to the collect position using the mouse 110. In search mode 12, Internet research tool 102 can access a remote Internet site, such as Internet site 16. Both search and collect modes have a unique set of tools that are displayed in a frame 26b (shown in FIG. 4A) in window 132 on display monitor 106. In collect mode 14, Internet research tool 102 can collect data from remote Internet site 16 and produce clipping file 18 on computer storage medium 112.

Clipping file 18 contains a user-selected portion of a web page. System-provided information 19, such as a citation, is automatically included in the clipping file 18. Additionally, user-generated information 17, such as notes, can be included with the clipping. An Internet research tool 102 is self-contained in the sense that it does not require a word-processing application to run concurrently in another window to provide functions, such as operations that paste data from a clipboard and save a file to disk. One context is set up for a view on local display monitor 106. Searching for information on the Internet, collecting information from an Internet web page, generating a clipping with user-provided and system-provided information, and saving the clipping to a local storage device takes place within the same user-interface environment.

Figure 4A:
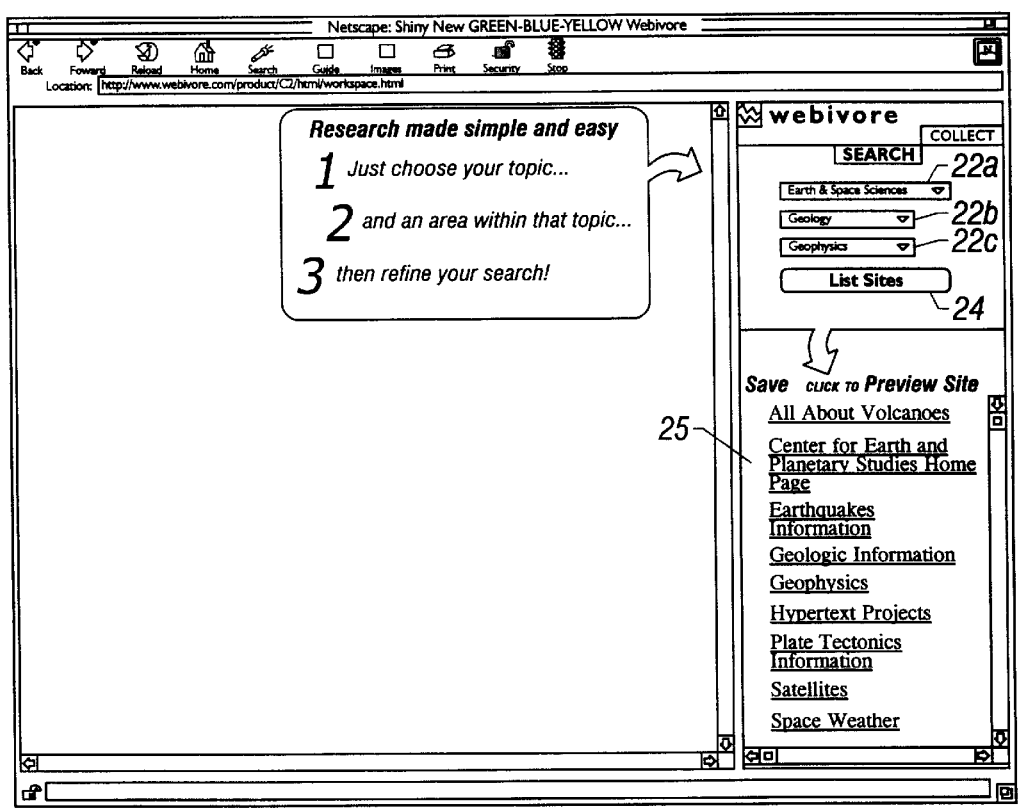
FIG. 4A is an illustration of a prompt, pull-down menus, and a scrolling list.

Shown in FIG. 4A, in the frame 26b in the right portion of the window 132, are the search tools. Topic selection search tools include pull-down menu 22a, and pull-down menus 22b, 22c (shown in FIG. 4B) that enable a user to conduct a hierarchical search for a web site. The hierarchical search has three levels, each level further narrows the search topic. Using the pull-down menus, a user can select a new topic at any level at anytime while Internet Research tool 102 is in search mode 12, so long as a higher level topic is chosen prior to selecting a lower level topic. While searching for and examining web sites, the user is always aware of the hierarchical path taken to reach the web site because the pull-down menus 22a, 22b, 22c continue to display the names of the selected topics.

A prompt 21 directs the user to choose a first-level topic using the top-level pull-down menu 22a. As is typical with pull-down menus, menu selections appear on the menu when the menu is pulled down. Here, first level topics are listed when pull-down menu 22a is pulled down. After choosing a first-level topic, such as the Earth and Space Science topic, the name of the topic is displayed on the top-level pull-down menu 22a and the prompt 21 directs the user to select an area within the first topic by using the second-level pull-down menu 22b (shown in FIG. 2B).

Second-level topics beneath Earth and Space Science include Astronomy and Space, Environment, and Geology. The names of the second-level topics are listed on the pull-down menu 22b when the user pulls down menu 22b. After selecting a second-level topic in the topic hierarchy, the name of the topic is displayed on the pull-down menu 22b and the prompt 21 directs the user to further refine the search topic. The topic titled Our Solar System belongs to the third hierarchical level and, as shown in FIG. 4A, was selected as the third-level topic because the title appears on the third-level pull-down menu 22c. Note that the topic hierarchy does not need to be symmetrical. A first-level topic may have only one subordinate level. The topic hierarchy is continuously displayed while Internet research tool 102 remains in search mode.

Available sites are displayed below the third pull-down menu as a result from the topic selection in the third pull-down menu. The sites are presented to the user as a scrolling list 25 in the user interface. Only pre-selected sites that have gone through a screening process are visible using the scrolling list 25 and initially accessible via search mode 12.

Pre-selected sites provide for a level of quality control in the research process. For example, prior to an Internet research tool 102 allowing access to a web site by choosing the site in the scrolling list 25, the site can be checked to ensure that it is reachable and up-to-date. Additionally, the quality of the site can be measured against agreed upon expectations. For example, a site's information content can be checked to ensure that it meets a determined level of scientific or historical scrutiny.

Figure 4B:
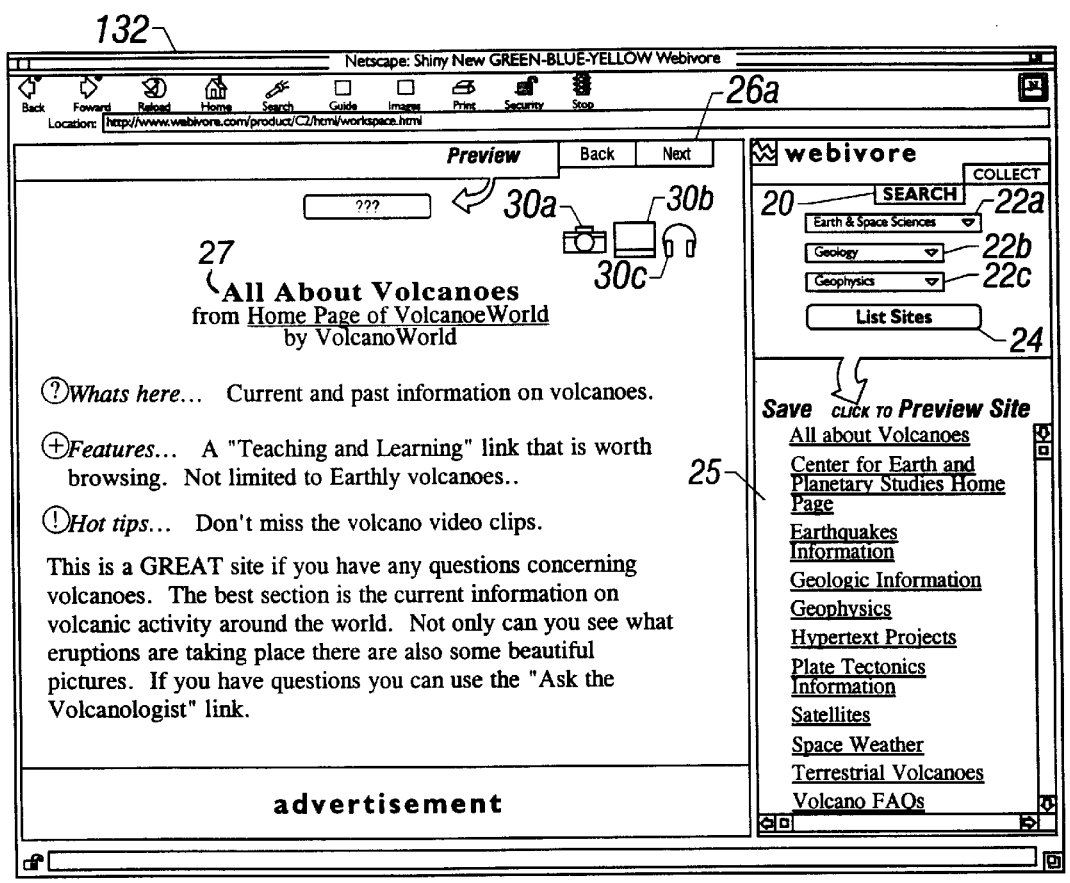
FIG. 4B is an illustration of a site preview in search mode.

Referring now to FIG. 4B, each pre-selected web site has an associated abstract, called a preview, that briefly describes the web site. When a web site is selected from the scrolling list 25, the preview is displayed automatically in target frame 26a, which initially occupies most of window 132 in the left portion of window 132. The preview describes the content of a preselected site, and contains a title 27 that may be the site name, author name 28, the date the site was reviewed (not shown), and one or more category classifications (not shown). The preview enables a user to investigate a web site before accessing the site and collecting data. The previews are stored in a database on web server 126 and accessible when GUI element switch 20 is set to the SEARCH position.

Additionally, icons in a preview indicate a site's features, which may include images, audio data, video data, and other multi-media types of data. Icon 30a in FIG. 4B indicates to the user that the site has images. An icon 30b displaying a moving image inside a graphic resembling a video monitor indicates video features, and an icon 30c resembling headphones indicates audio data. The icons 30a, 30b, 30c are useful not only as visual indicators of a site's features, but also to alert the user that a time lag may occur when loading data and to alert the user that memory constraints may be noticeable when loading and saving some of a site's features.

The pre-selected web site is accessed through a hypertext link when the user selects the underlined portion of title 27 that is the hypertext link from target frame 26a. When the user clicks on the underlined portion of title 27 using a pointing device such as a mouse 110, the Internet research tool 102 replaces the preview in target frame 26a with contents provided by the pre-selected web site linked through title 27. Different pages of a web site are perused in the same manner as a user peruses web pages using the installed browser. Any web sites linked to the displayed site (e.g., through a hypertext link) are also viewable. The linked sites are not pre-selected sites so the linked sites do not have the benefit of a preview. However, the research tool 102 allows for the collection of information from any site that is displayed in the target frame 26a.

Figure 4C:
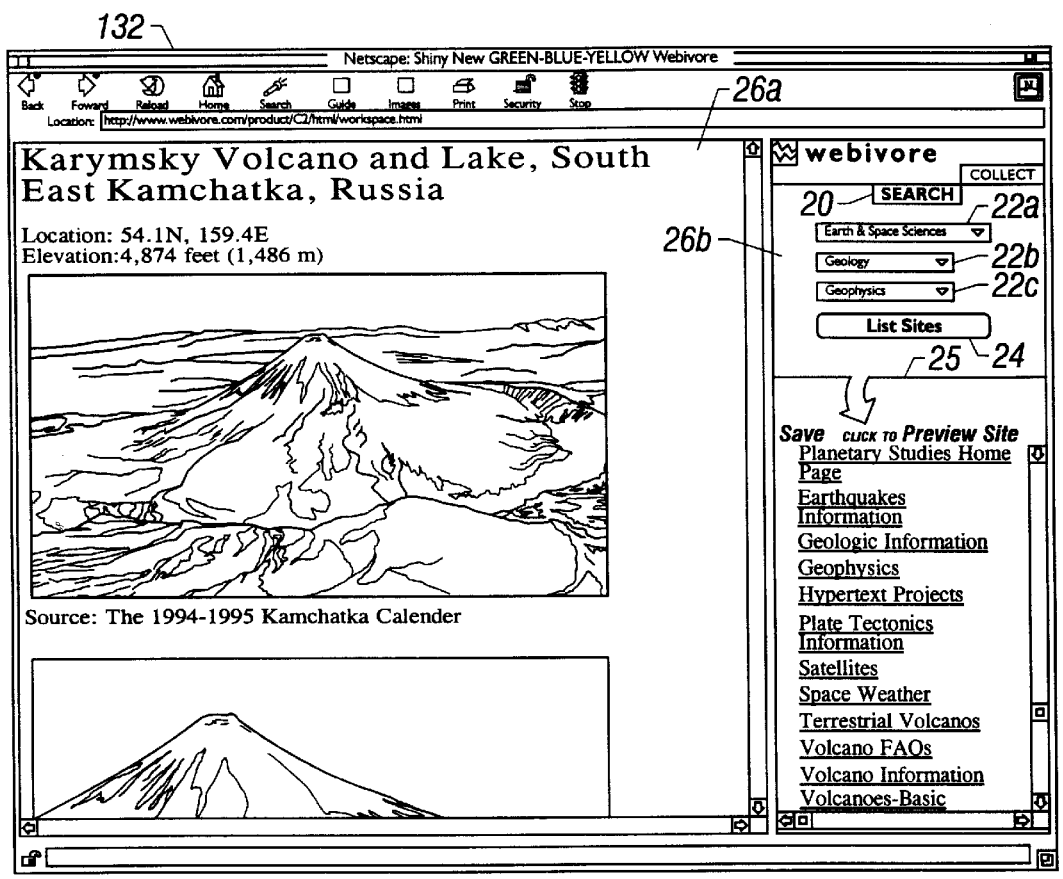
FIG. 4C is an illustration of a web page and search tools.

Referring now to FIG. 4C, a web page from a pre-selected web site is shown. Research tool 102 provides a consistent environment when searching for a web site and collecting data from a web site. The web page displayed in target frame 26a in the left portion of the user interface window 132 is initially displayed while in search mode and remains after the transition from search mode to collect mode.

Figure 4D:
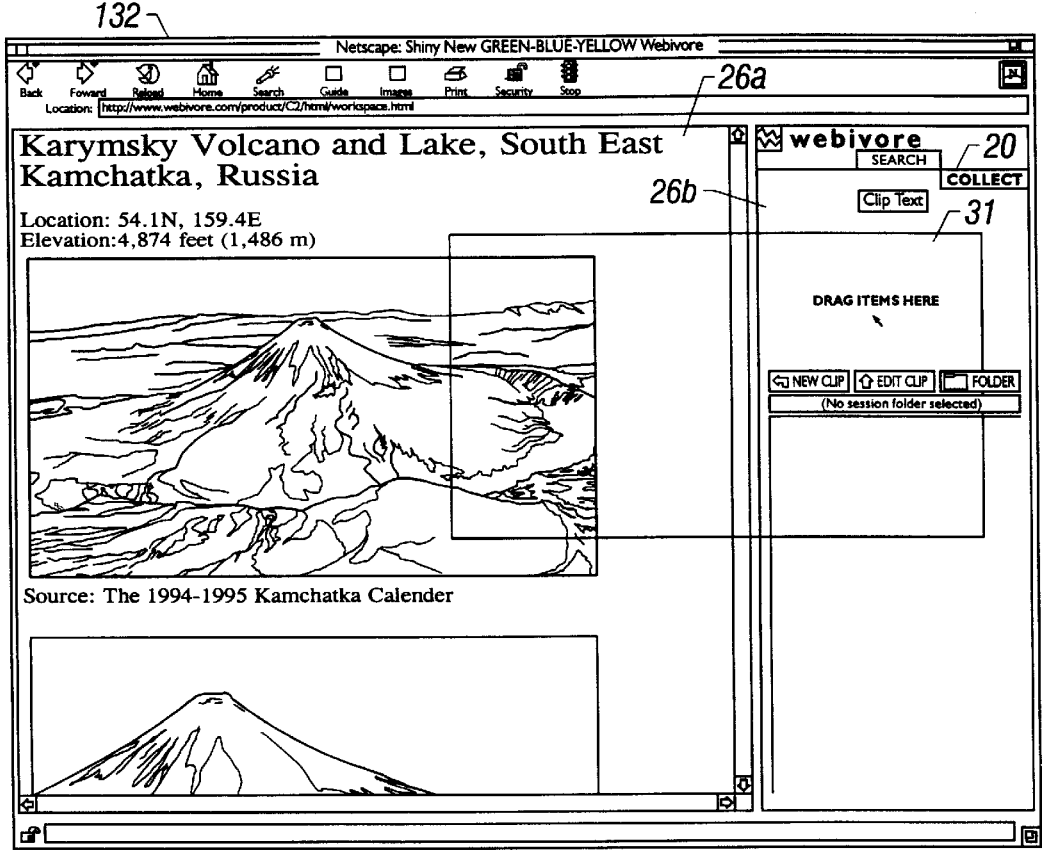
FIG. 4D is an illustration of a web page and collection tools.

Referring now to FIG. 4D, setting GUI element switch 20 to the COLLECT position enables research tool 102 to collect data from the web page and produce a clipping file 18. After setting GUI element switch 20 to COLLECT, the web page remains in target frame 26a; however, a distinct set of collection tools are displayed in frame 26b, replacing the search tools.

Collect mode 14 provides a collect area 31 to which selected items, such as text and images, are dragged and dropped using mouse 110. Each collected item can be stored with user-generated information 17 and system-provided information 19 as a separate clipping file 18. Text is gathered using copy and paste operations. Generally, the implementation of drag and drop operations and copy and paste operations depend on the installed browser's capabilities. In collect mode 14, Internet research tool 102 produces an HTML file in which data is stored on disk. The HTML file is stored in a file folder having a filename that a user specified in a dialog box when data is saved to a particular clipping.

Figure 4E:
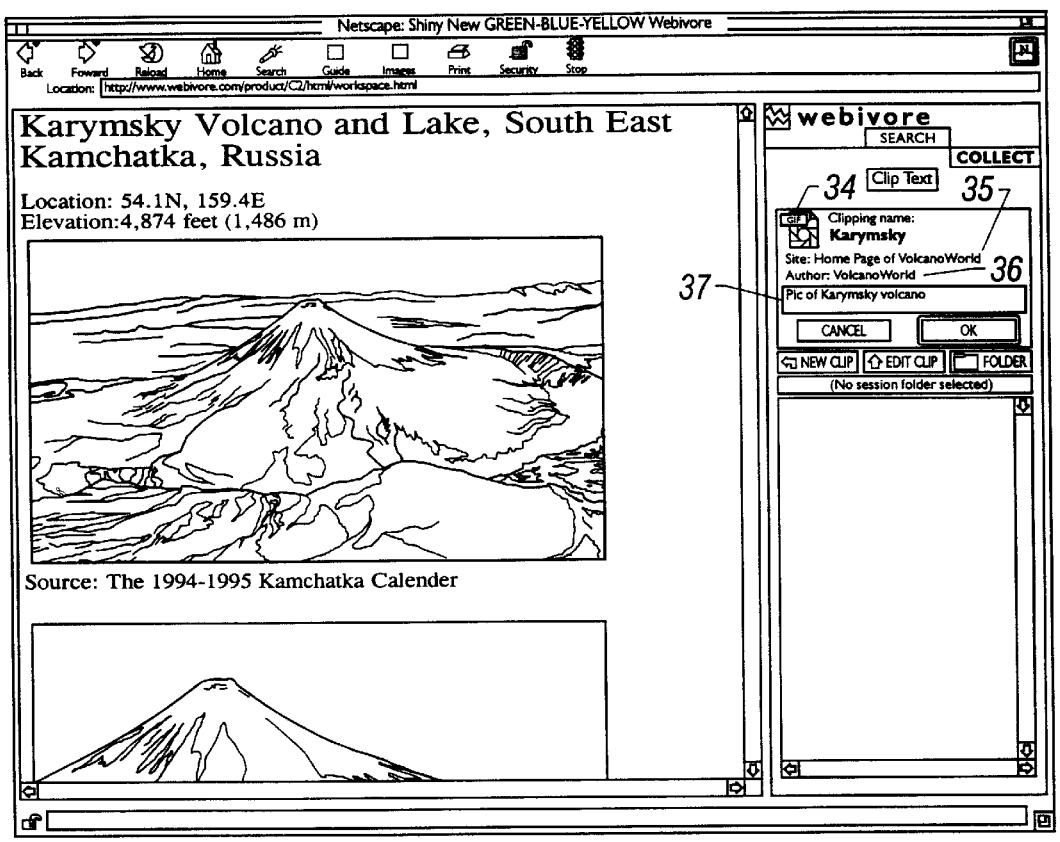
FIG. 4E is an illustration of a web page and collection tools.

Referring now to FIG. 4E, Internet research tool 102 displays information about clipping file 18. Clipping file 18 may be text, a graphics image, video data, audio data, or any mime-type that the system is configured to recognize. Icon 34 indicates the clipping type. For example, one graphic represents an image, another graphic represents text. References, such as site name 35, site author 36, URL (not shown), and dates are automatically stored with clipping file 18. These references provide the basis for bibliographic and citation information. Additionally, the user can add notes 37 to clipping file 18.

Figure 4F:
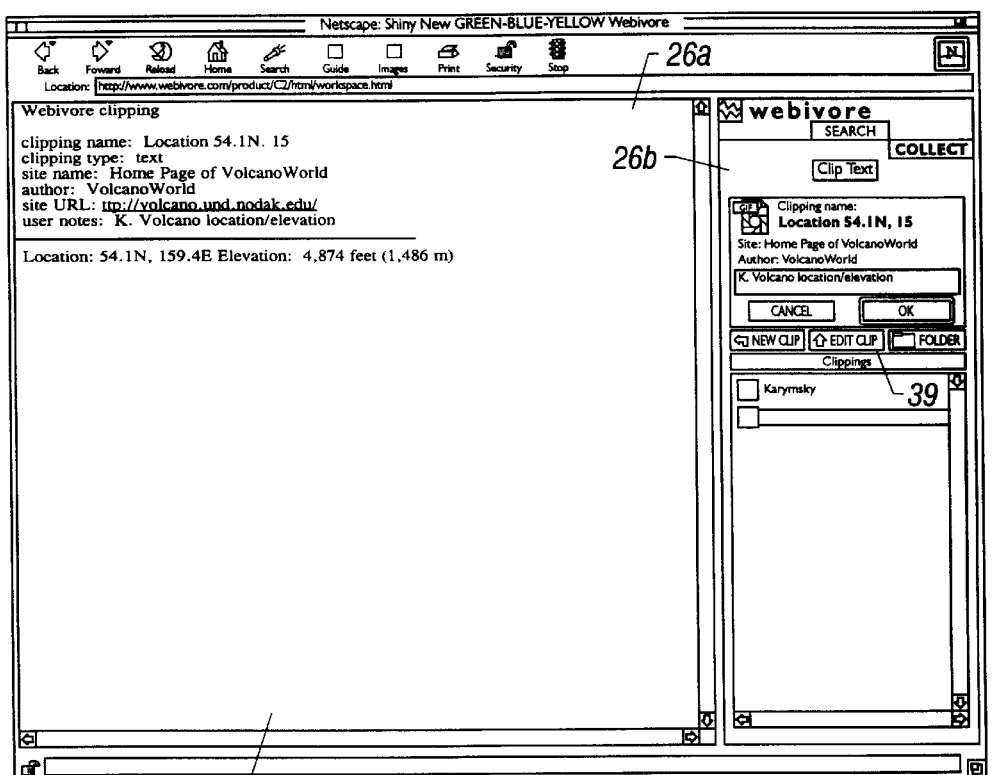
FIG. 4F is an illustration of a human-perceptible clipping.

Referring now to FIG. 4F, a human-perceptible form of the clipping file 18' is shown. The clipping in a human-perceptible form 18' is analogous to a page in a researcher's notebook. Internet research tool 102 displays the human-perceptible form of the clipping file 18' in the same target frame 26a as the corresponding preview and the corresponding web site. The human-perceptible form of the clipping file 18' is displayed after the user selects the VIEW CLIP button (not shown). User added notes and a filename may be edited by choosing the EDIT CLIP button 39. Additionally, the human-perceptible form of the clipping file 18' can be output to a hard-copy device using the browser's print command.

Figure 5:
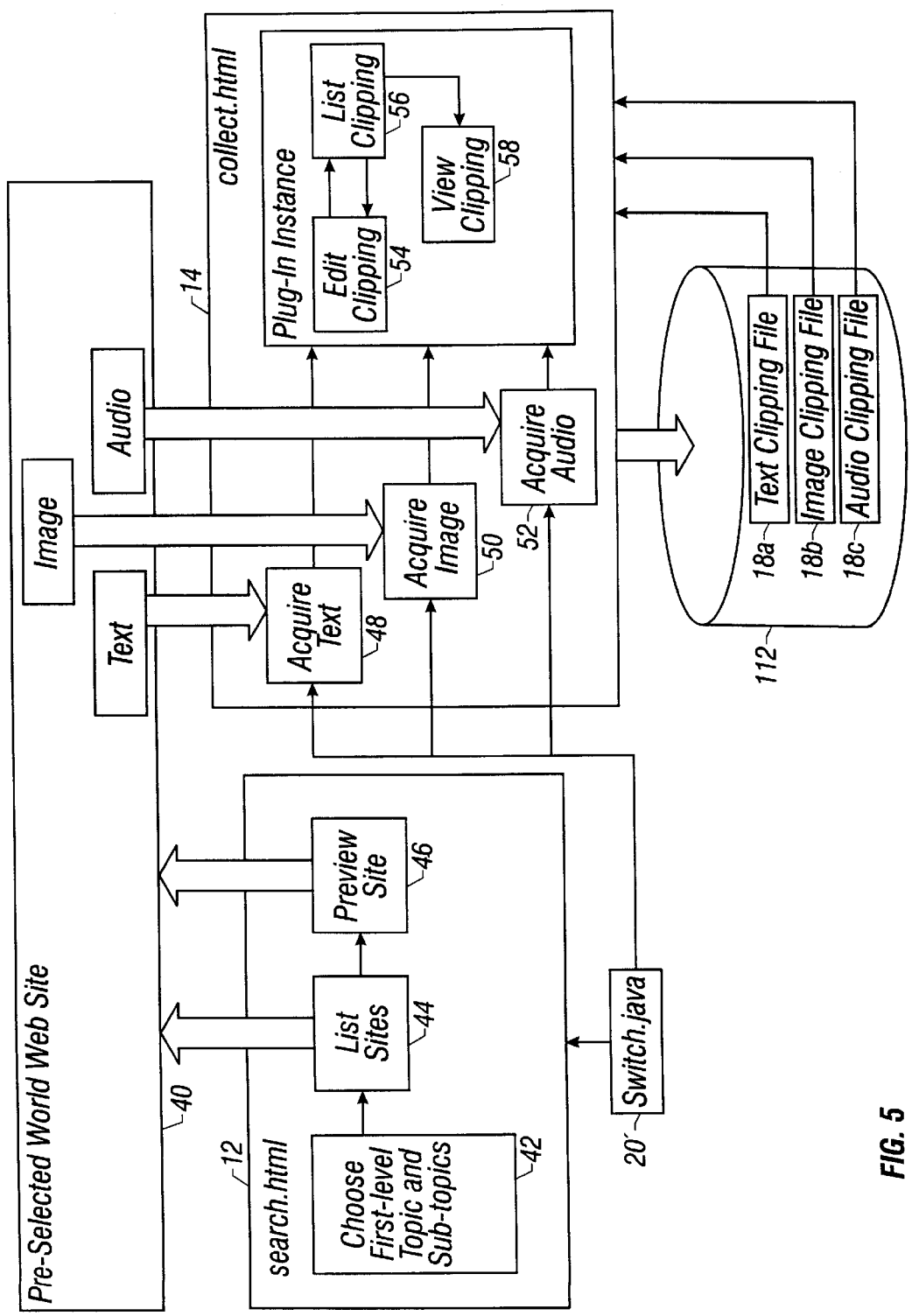
FIG. 5 is a diagram of a pre-selected web site with respect to search and collect modes.

Referring to FIG. 5, a diagram of a pre-selected web site with respect to search and collect modes is shown. Search mode 12 and collect mode 14 are implemented as HTML (hypertext markup language) files named search.html and collect.html, respectively. GUI element switch 20 is implemented as a Java applet named Switcher.java 20', which is a program written in the Java programming language and executed by a browser, such as Internet Explorer™ version 3.0 or higher, or Netscape Navigator™ version 3.0 or higher. Switcher.java 20' sets the Internet Research Tool 102 to search mode or collect mode when Switcher.java 20' detects a mouse click event.

When search.html is active, a user can choose a topic and sub-topics (step 42). As discussed, Internet research tool 102 has a hierarchy of topics. Research tool 102 has a category navigator, implemented as a Java applet, to access the topic hierarchy via pull-down menus 22a, 22b, 22c shown in FIGS. 4A, 4B, and 4C. Once a top-level topic is selected, sub-topics can be selected and displayed via second and third-level pull-down menus 22b, 22c. To list the sites, the user uses the mouse to press a GUI element 24 that has an appropriate label such as "List Sites." The Internet Research tool 102 detects the mouse event, contacts the web server 126, and retrieves a list of sites that match the selected topics. The list of sites is transmitted to the window 132 (step 44), and displayed as the scrolling list 25 in the right area of the user interface window below the third-level pull-down menu 22c (as shown in FIGS. 4A–4C). The site list is implemented as an HTML file.

When a pre-selected web site 40 is chosen from the scrolling site list 25, the web server 126 transmits a file that contains a brief description of the site, called a preview, to the local computer where the preview is displayed in target frame 26*a* in window 132 (step 46). The preview helps the user determine whether to access the pre-selected web site 40 through a hypertext link appearing in window 132 as title 27. Thus, choosing pre-selected web site 40 and accessing pre-selected web site 40 are separated in time by previewing the site. The user has the choice of spending as much or as little time reading the preview as necessary and desired.

Internet research tool 102 utilizes a plugin. A plugin is a computer software program that extends a browser's capabilities. Unlike a Java applet, a plugin allows processes to save data to a hard disk. Netscape and Microsoft provide plugin protocols and instructions to build plugins. Internet research tool 102 has one plugin written in C++ with customized computer code to extend the capabilities of Microsoft Corporation's Internet Explorer™ and Netscape Communication Corporation's Navigator™ browsers. The plugin detects which browser is installed, and due to unique requirements of these browser products, only executes the code that is compatible for the installed browser. The plugin allows for drag and drop operations, gets bibliographic information, and saves the information to a local storage medium.

Internet research tool 102 maintains a data structure that contains the pre-selected web site names and their respective URLs. When a user selects a pre-selected web site, Internet research tool 102 reads the data structure and gets the URL for the pre-selected web site selected by the user. The pre-selected web site is accessed using a plugin. The plugin is instantiated using JavaScript. A site name, site author, and URL are passed to the plugin via arguments in an EMBED call.

Internet research tool 102 takes advantage of the capability that multiple plugin instances share common memory. Global data (e.g., URL information) and a pointer to the main plugin are stored in common memory. Multiple instances of the plugin can come into and out of existence and share information, and temporary instances can initiate main plugin operations.

Internet research tool 102 instantiates the plugin on three different occasions. First, selecting a web site while in search mode 12 causes a "site-selection" instance of the plugin to be embedded into an invisible frame. This generates a plugin shell, if one does not exist. The plugin shell maintains various global variables shared by other instantiations of the plugin. Other global variables produced by the site-selection instance maintain information about the last pre-selected web site visited. These variables are used by a "main" plugin instance and are attached to clippings as the clippings are generated.

A second occasion for instantiating the plugin is when switching to collect mode 14. This instantiation produces the "main" instance of the plugin, if one does not exist. A plugin shell is also produced at this time if one does not presently exist. The plugin generates objects that show interface elements, control disk access, handle drag operations, and maintain a list of clippings.

Internet research tool 102 detects when GUI element switch 20 changes state by using common user interface techniques, for example when a mouse click occurs while the mouse 110 is in a particular location. When GUI element switch 20 changes state to COLLECT, the Java applet Switcher.java 20' initiates the loading of the plugin. User interface collection tools, devoted to clipping and saving information, are displayed in the frame 26*b* in the right portion of window 132. The content in target frame 26*a*, displayed in the left portion of window 132, remains unchanged.

A third occasion for instantiating the plugin is when research tool 102 begins to produce a clipping. Both the plugin shell and "main" plugin objects should already exist. The "main" plugin object is retained as a global pointer in the plugin shell, so that its functions may be called.

In collect mode 14, the research tool acquires text (step 48), acquires images (step 50), and acquires audio data (step 52) from pre-selected web site 40. Text, images, and audio data can be collected into separate clipping files (18*a*, 18*b*, and 18*c*) and stored on disk 112. Text, images, and audio data can also be collected into the same clipping file.

To produce a text clipping in a PC/Netscape environment, the user highlights the desired text and clicks on the appropriate user-interface button. The collect area displays the clipping type, text clipping name, site author, site name, and a notes box 37 where the user adds his or her own notes (as shown in FIG. 4E).

Research tool 102 automatically stores the clipping in an HTML clipping file 18 located locally on disk 112 and displays the human-perceptible form of the clipping 18' in target frame 26*a*. The user can edit the clipping file 18 (step 54), list all clipping files 18 that exist in a file on disk 112 (step 56), and simply view the human-perceptible form of the clipping 18' (step 58). Along with the clipped data (e.g., text or image), the clipping name and type, the site name, author, and URL, and user notes are also displayed.

Other embodiments are within the scope of the following claims. Internet research tool 102 can be adapted to any field of interest, including business topics, hobbies, and legal fields of interest. Internet research tool 102 may also clip video images from the Internet. User interface and implementation details differ depending on the browser installed on the computer system 100.

Having described preferred embodiments of the invention, it will now become apparent to one of skill in the art that other embodiments incorporating its concept may be used. It is felt, therefore, that this invention should not be limited to the disclosed embodiment, but rather should be limited only by the spirit and scope of the appended claims.

What is claimed is:

1. A computer-implemented method for conducting research on the Internet, the method comprising:

accessing a pre-selected web page on a computer network;

providing a view of the web page on a computer monitor;

providing a switch to change from a search mode that accesses the web page to a collect mode that enables a user to identify a portion of data provided in the view, receiving user input identifying a portion of data to be clipped provided in the view;

saving the identified portion of data to another file using the same graphical user interface that provides the view; and receiving a reference annotation from the pre-selected web page, the reference annotation containing information corresponding to at least the portion of the web page in the view, and adding the reference annotation corresponding to the web page in the view to the file.

2. The method of claim 1, further comprising:

replacing a set of search tools with a set of collection tools in the same screen space.

3. The method of claim 2, wherein the search tools provide a hierarchical presentation of a plurality of topics and continuously display a selected hierarchical path.

4. The method of claim 1, further comprising outputting the file to a frame in a web browser displayed on the computer monitor.

5. The method of claim 1, wherein the clipped portion of data includes more than one feature of the web page.

6. The method of claim 5, wherein the features include multi-media data.

7. The method of claim 1, further comprising:

adding a user-generated annotation to the file.

8. The method of claim 1, wherein the reference annotation comprises citation information.

9. The method of claim 1, wherein location information about the clipped portion relative to the URL of the view is stored.

10. The method of claim 1, further comprising:

allowing access only to pre-selected web pages; and displaying a preview of the web page prior to accessing the web page.

11. A computer-implemented method for conducting research on the Internet, comprising:

receiving user input choosing a topic from a list of topics;

locating data stored on a first computer medium attached to a remote computer, wherein the data is associated with the topic;

displaying the data on a local computer monitor;

switching from a search mode to a collection mode;

receiving user input selecting a portion of the data;

saving the portion of the data in a file on a second computer medium; and receiving from the remote computer and saving a citation reference with the data in the file on the second computer medium, the citation reference being descriptive of at least the user selected portion of the data stored on the first computer medium; and also storing location information of the selected portion relative to the data being displayed.

12. The method of claim 11, further comprising:

editing the file to include user-supplied data.

13. The method of claim 11, further comprising:

remaining within the same user interface boundary while locating, selecting, and saving data.

14. A computer program, residing on a computer-readable medium, comprising instructions causing a computer to:

present a selection of web pages on a computer monitor;

access one web page in the selection through a computer network;

display the one web page in a frame on the computer monitor;

provide a switch to change from a search mode that accesses the web page to a collect mode that enables a user to identify a portion of data provided in the view;

receive user input that identifies a portion of data to be clipped from the frame;

save the identified portion of data to a file;

produce a human-perceptible document from the clipped data and reference annotation.

15. The computer program of claim 14, further comprising instructions causing a computer to:

annotate the clipped data with a bibliographic reference.

16. The computer program of claim 14, further comprising instructions causing a computer to:

display a description of the web page prior to accessing the web page.

17. A computer program, residing on a computer-readable medium, comprising instructions causing a computer to:

receive user input that chooses a topic from a hierarchical list of topics while displaying a hierarchical path;

locate data stored on a first computer medium attached to a computer, wherein the data is associated with the topic;

display the data on a computer monitor;

receive user input to switch from a search mode to a collection mode;

receive user input that selects a portion of the data;

save the portion of the data to a file on a second computer medium; and receive and save a citation annotation with the data in the file on the second computer medium, the reference annotation containing citation information corresponding to at least the selected portion of the data store location information about the clipped portion relative to the location of the data being displayed.

18. The computer program of claim 17, further comprising instructions causing a computer to:

display a preview of the web page prior to accessing the web page; and remain within one user-interface environment during the search mode and collect mode.

19. The method of claim 18, further comprising instructions causing a computer to:

add user-supplied data to the file.

* * * * *